Figure 1:
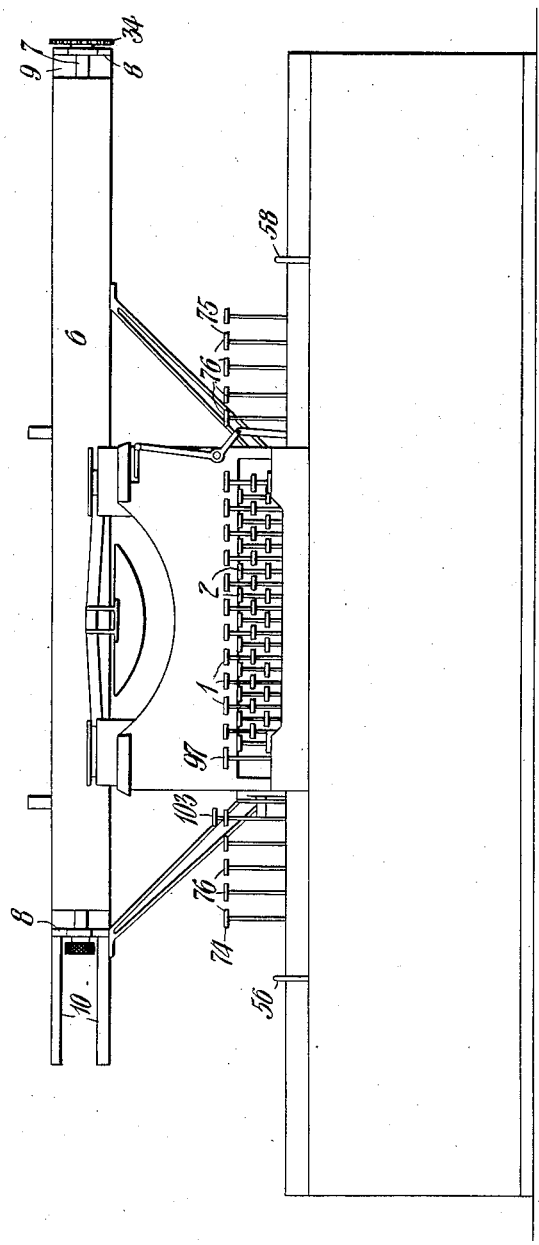

S. E. CARLIN.
TYPE WRITING MACHINE.
APPLICATION FILED FEB. 21, 1913.

1,156,464.

Patented Oct. 12, 1915.
9 SHEETS—SHEET 1.

WITNESSES:

INVENTOR:
Samuel E. Carlin
BY
ATTORNEY

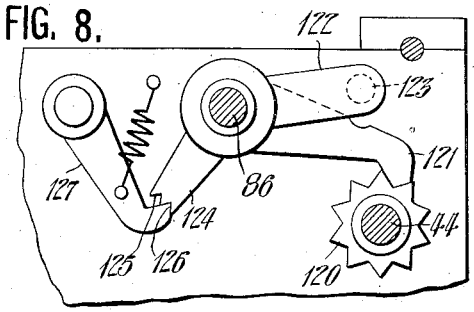
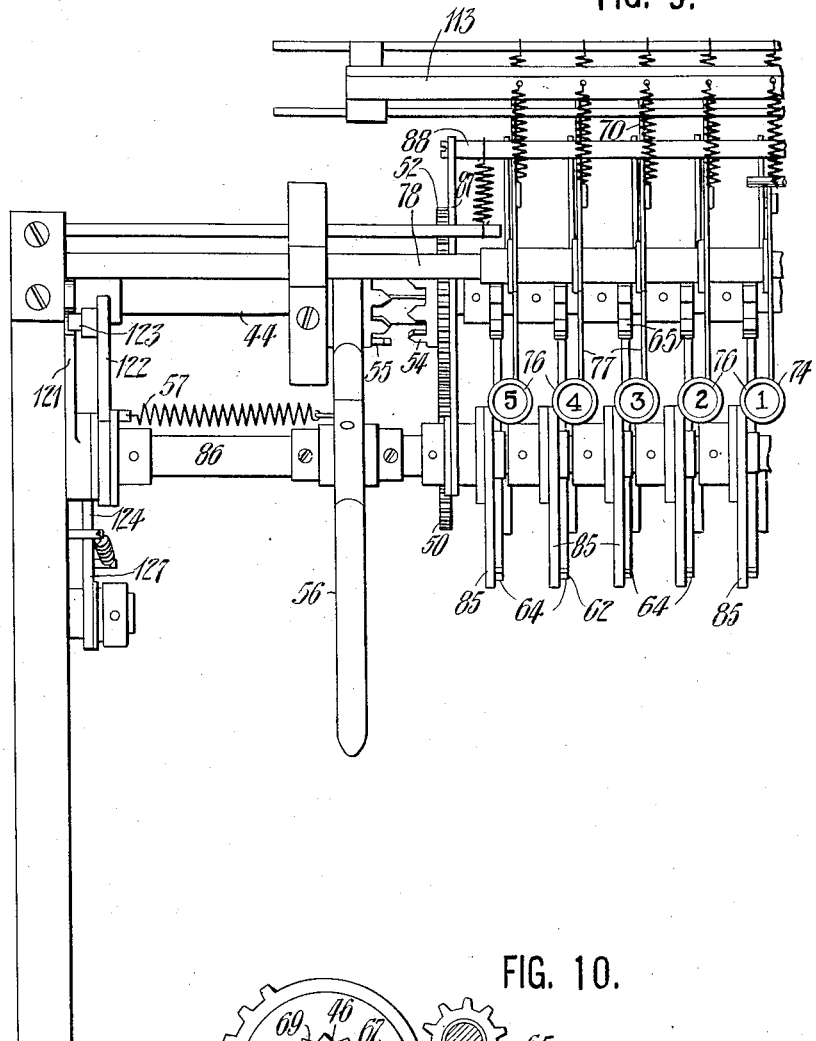
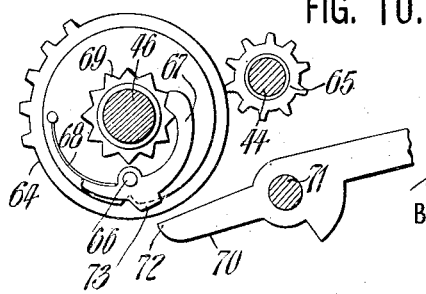

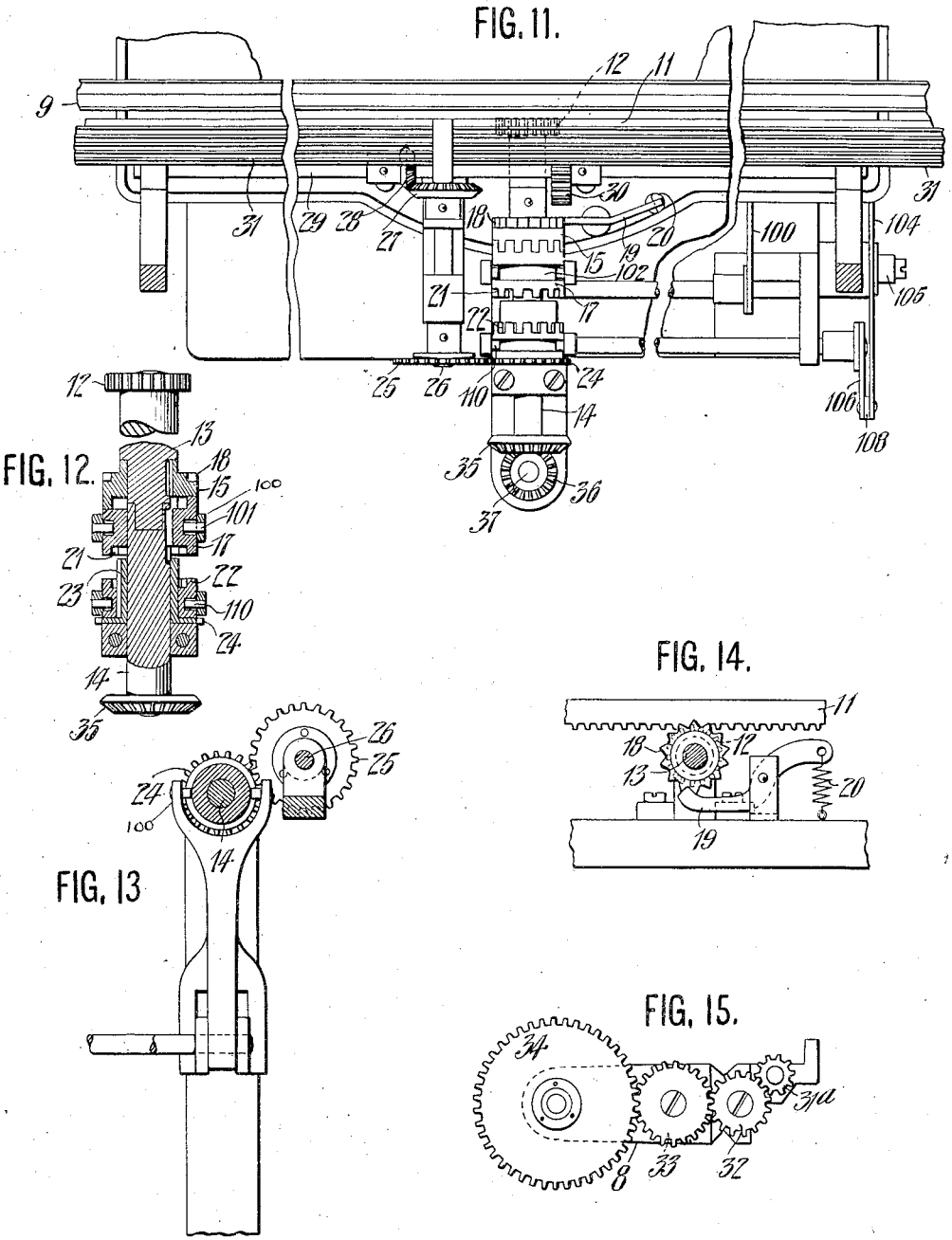

S. E. CARLIN.
TYPE WRITING MACHINE.
APPLICATION FILED FEB. 21, 1913.

1,156,464.

Patented Oct. 12, 1915.

WITNESSES:
F. E. Alexander
Julius Duckstine

INVENTOR:
Samuel E Carlin
BY B C Stickney
ATTORNEY

UNITED STATES PATENT OFFICE.

SAMUEL E. CARLIN, OF CHICAGO, ILLINOIS, ASSIGNOR, BY MESNE ASSIGNMENTS, TO UNDERWOOD COMPUTING MACHINE COMPANY, OF NEW YORK, N. Y., A CORPORATION OF NEW YORK.

TYPE-WRITING MACHINE.

1,156,464.  Specification of Letters Patent.  Patented Oct. 12, 1915.

Original application filed June 26, 1909, Serial No. 504,595. Divided and this application filed February 21, 1913. Serial No. 749,775.

*To all whom it may concern:*

Be it known that I, SAMUEL E. CARLIN, a citizen of the United States, residing in Chicago, in the county of Cook and State of Illinois, have invented certain new and useful Improvements in Type-Writing Machines, of which the following is a specification.

This invention relates to an improvement in typewriters, and more especially to mechanism for controlling the movement of the carriage and also for controlling the line-space movements of the platen, and is a division of my application, No. 504,595, filed June 26, 1909.

A feature of this invention is the provision of mechanism to enable a certain group of controlling elements to control selectively either the line-space movements of the platen or the traversing of the carriage from one point to another to vary the relation of the carriage with respect to the printing point.

A further feature of this invention is the provision of means to enable not only the selection of movements between the carriage and the platen, but also a selection as to the degree of movement either to a predetermined amount or to an undertermined amount.

A still further feature of this invention is to enable the selective movements of the platen or carriage either to the right or to the left in the case of the carriage, and forwardly or backwardly in the case of the platen.

To accomplish these features, a motor is provided with driving connections between this motor and the carriage, to enable the traversing of the carriage from the motor, and also with driving connections between the motor and the platen to enable the rotation of the platen. Clutches are provided to determine whether the carriage or the platen shall be actuated. Clutches are also provided which are common to both the driving connection to the carriage and the driving connection to the platen, which will enable the continuous movement of either one thereof in one direction or the other so long as the clutches are in their effective condition.

Mutilated gears having gradually ascending numbers of teeth from one to the highest are provided, which may be individually brought into the train of connection between the motor and either the carriage or the platen, so as to enable the spacing of one or the other, one, two, three, or any predetermined number of steps within the limits of the machine. Two series of these mutilated gears are provided, one for spacing in one direction and the other for spacing in the opposite direction.

Other features and advantages will hereinafter appear.

Figure 2:
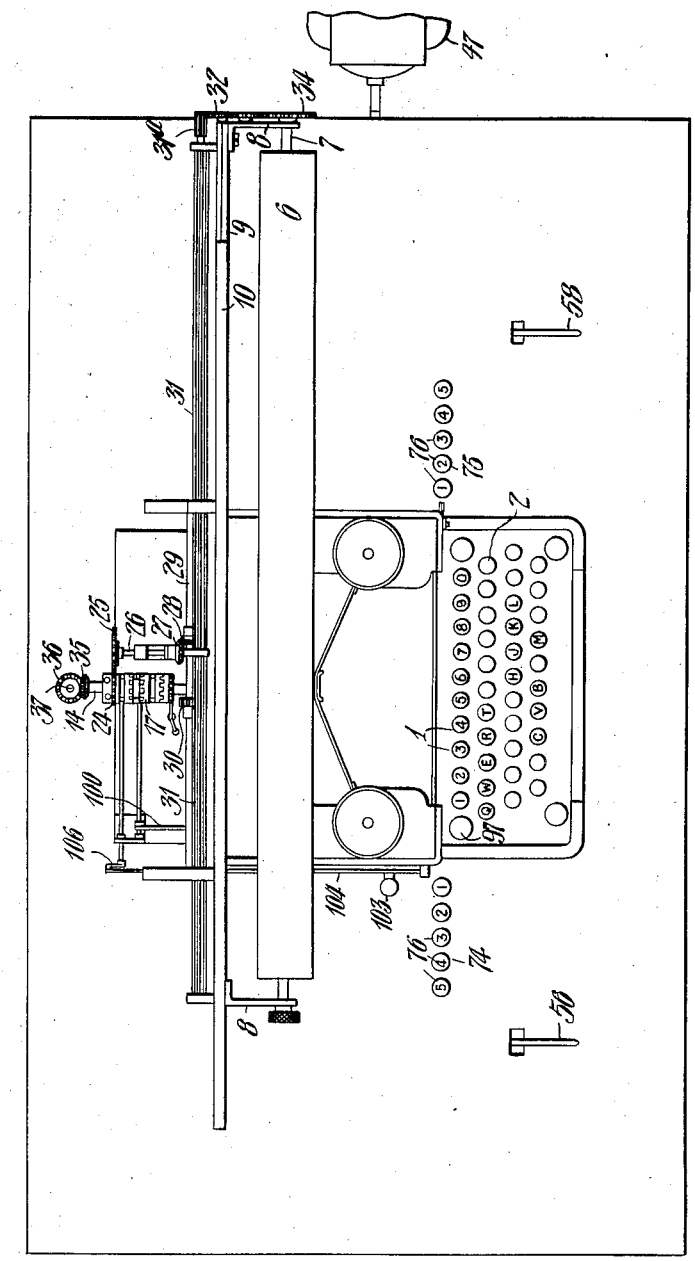
Figure 3:
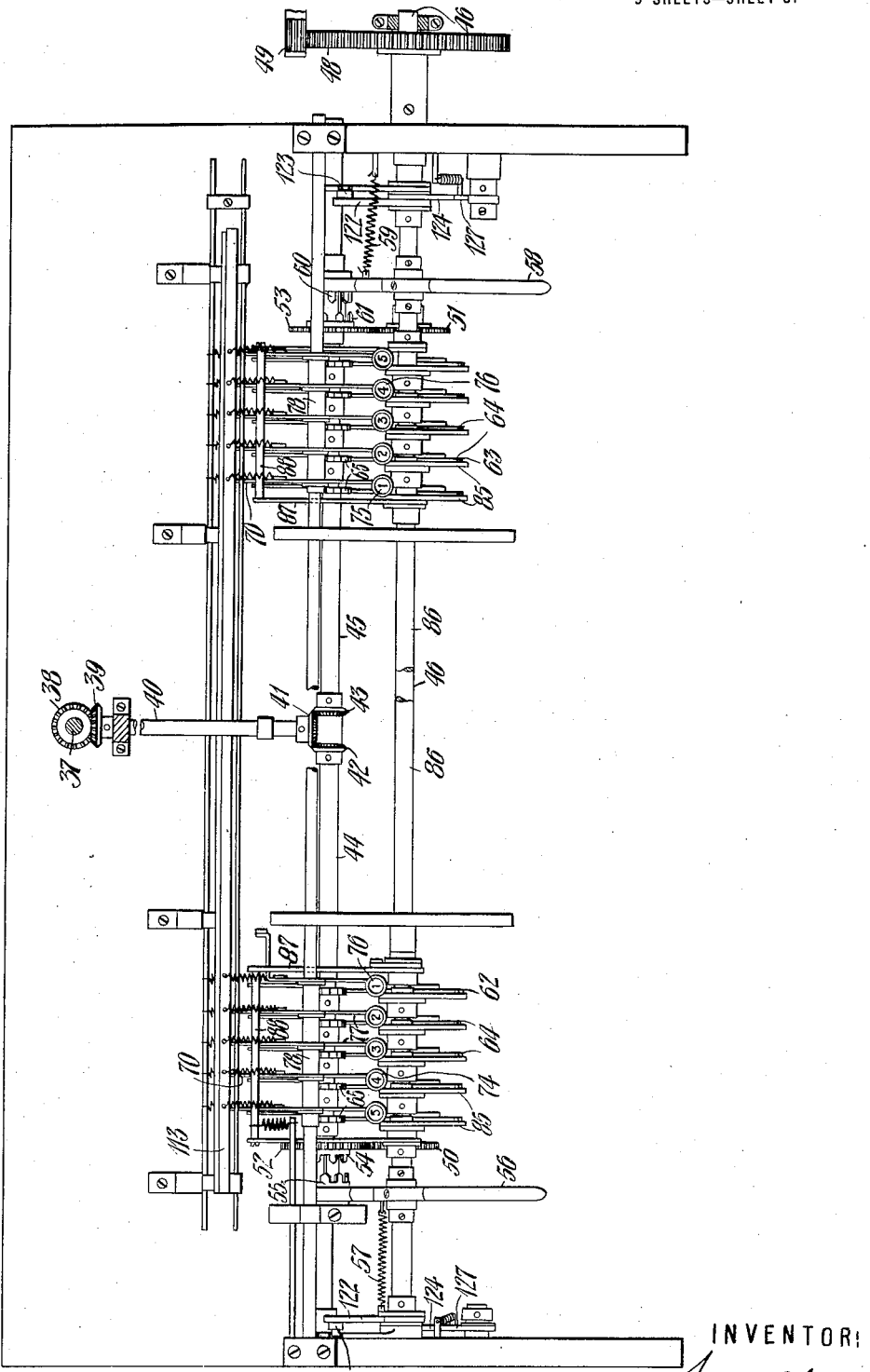
Figure 4:
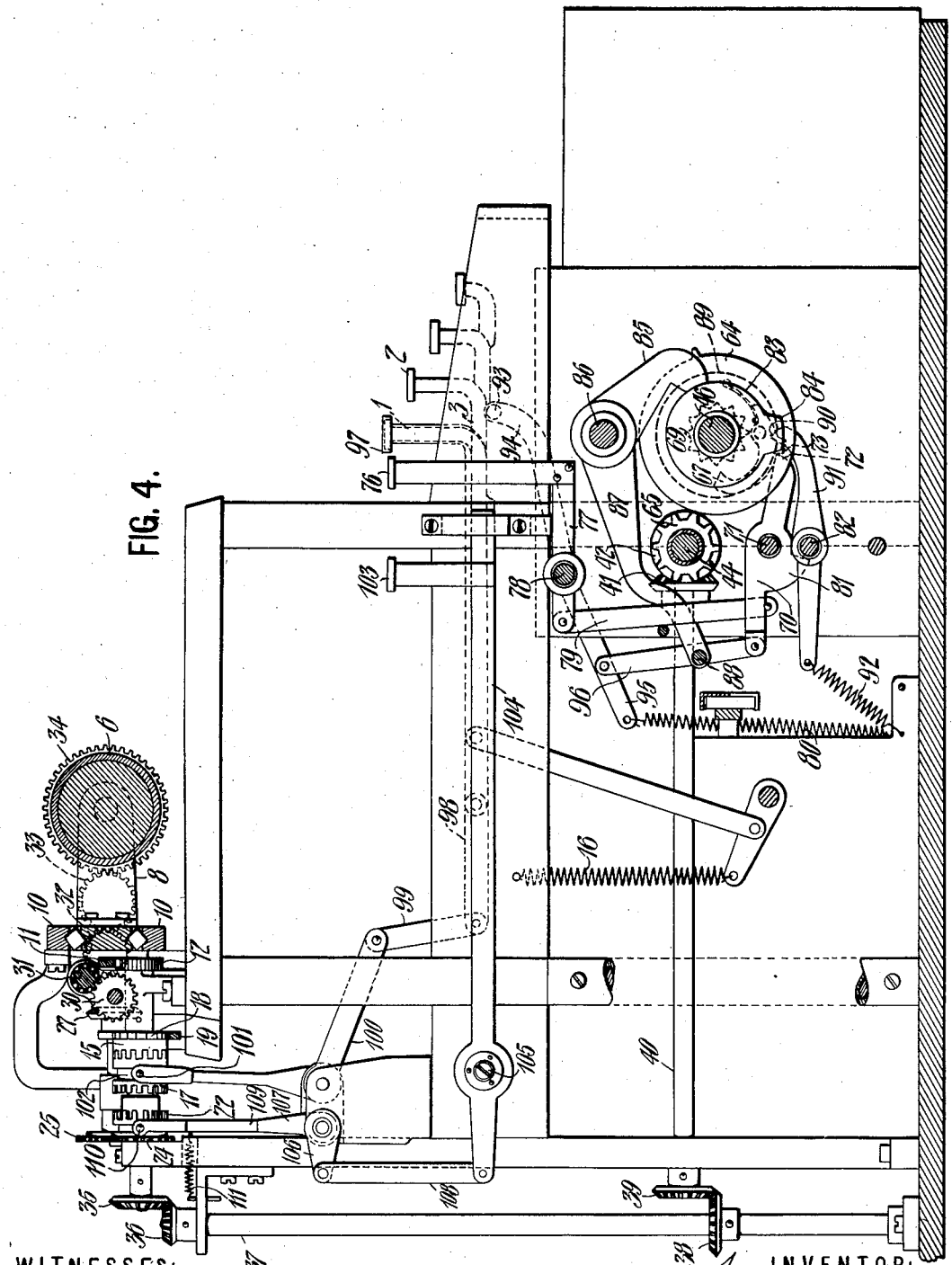
Figure 5:
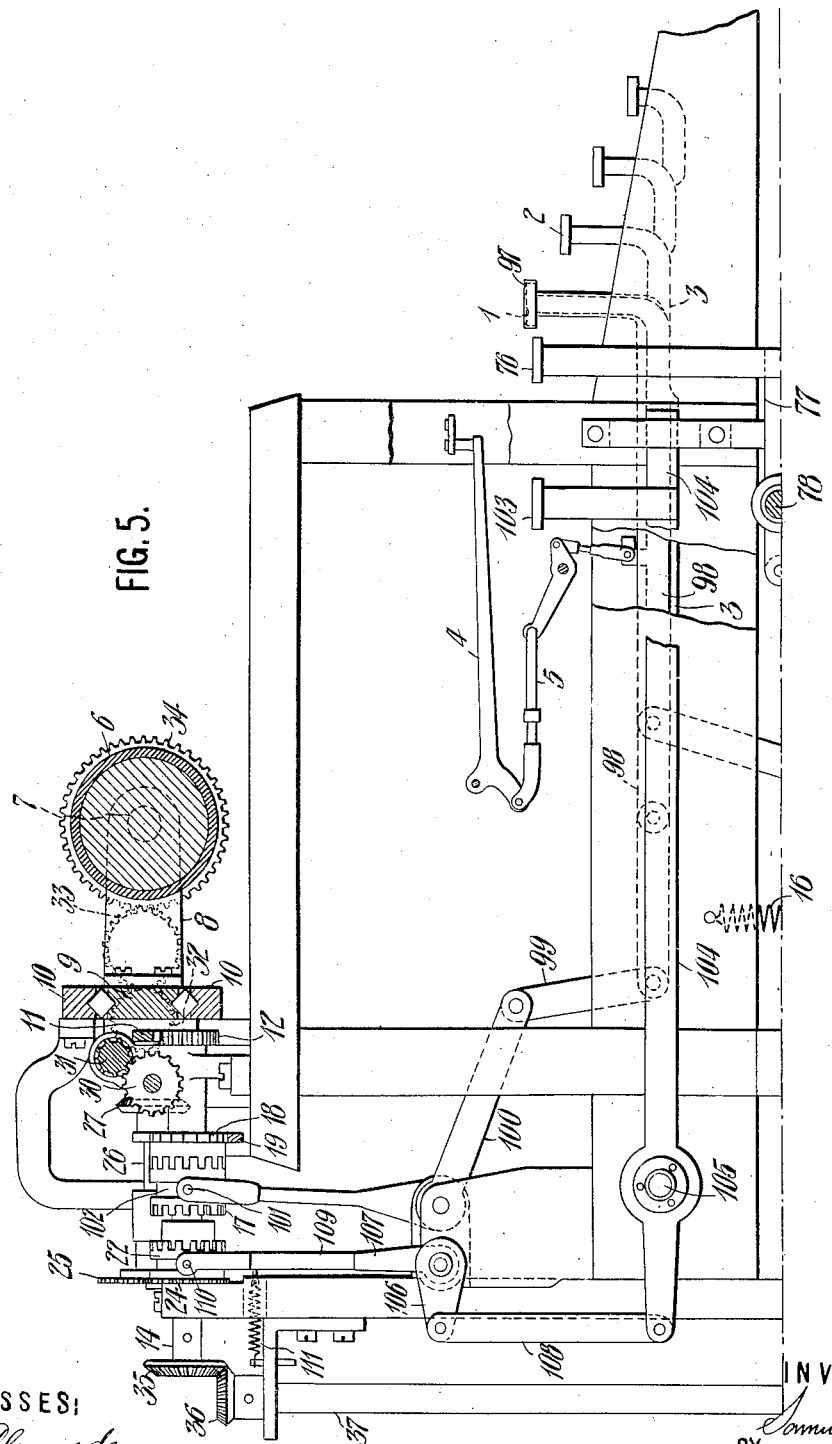
Figure 6:
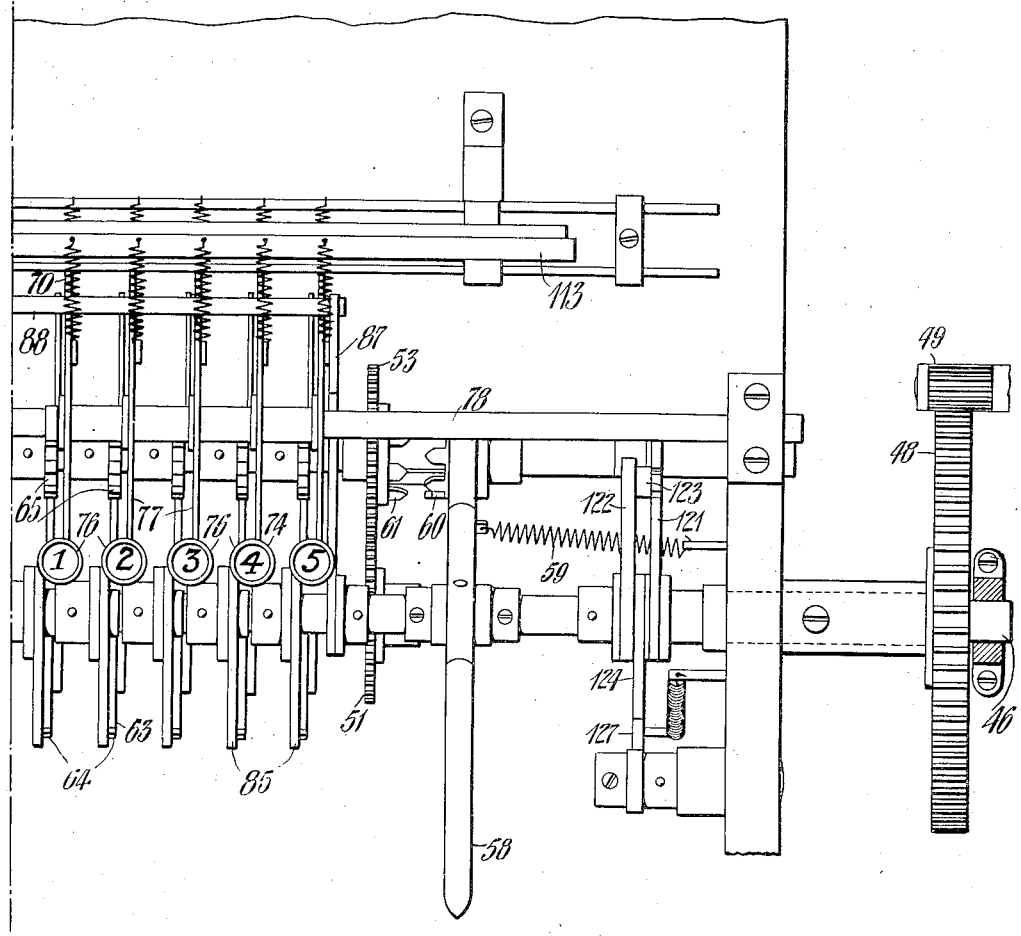
Figure 7:
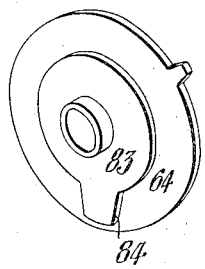

In the accompanying drawings Figure 1 is a front view in elevation. Fig. 2 is a top plan view. Fig. 3 is a skeleton plan view with some of the superposed parts removed to show the underlying structure. Fig. 4 is a vertical section taken from front to rear of the machine. Fig. 5 is a vertical section taken from front to rear of the machine, showing more particularly the type action. Fig. 6 is an enlarged fragmentary top plan view of the right-hand end of the machine showing the series of keys which controls the spacing of the carriage to the right or in a return direction, and the movement of the platen backwardly or in a back-spacing direction. Fig. 7 is a perspective view of one of the mutilated gears with its cam, and more particularly the mutilated gear which controls a single step-spacing movement. Fig. 8 is a fragmentary vertical section of the left-hand end of the machine, showing one of the detents for preventing overthrow of one of the drive shafts. Fig. 9 is a view similar to Fig. 6 but taken of the left-hand portion of the machine. Fig. 10 is a detail vertical section showing the relation of one of the mutilated gears to the gear and shaft which it drives, with the means for clutching the mutilated gear to the continuously-rotating shaft. In this instance, the gear shown is the five-tooth gear corresponding to a five-step movement of the platen or carriage. Fig. 11 is an enlarged top plan view showing the clutching arrangement whereby the selection may be made between rotating the platen and traversing the carriage. Fig. 12 is a horizontal section of the clutch mentioned in connection with Fig. 11. Fig. 13 is a vertical section through the clutch shown in Figs. 11 and 12.

Figure 17:
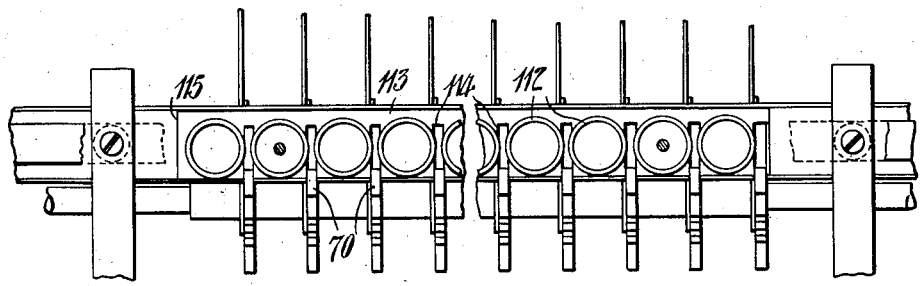
Figure 18:
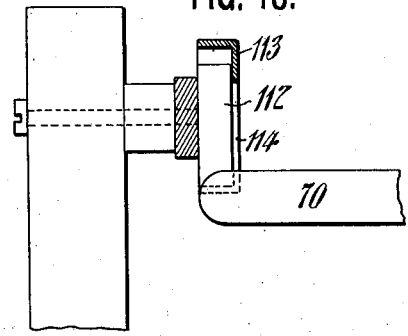
Figure 19:
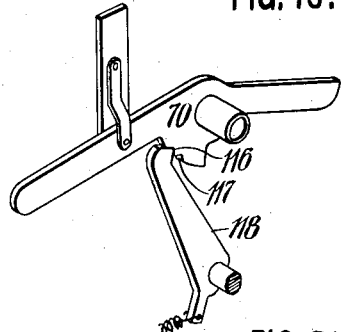
Figure 21:
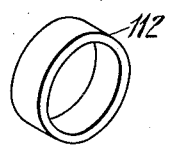
Figure 20:

Fig. 14 is a fragmentary detail view in elevation showing the justifying detent for accurately determining the stopping position of the carriage after having been traversed either to the right or to the left. Fig. 15 is a detail view in side elevation, showing the gearing connection between the elongated barrel gear and the gear on the platen. Fig. 16 is a detail perspective view of one of the mutilated gears, showing the notched disk whereby it is caught against overthrow. Fig. 17 is a contracted detail view in elevation, showing the locking means for preventing the connection of more than one mutilated gear to the continuously-rotating shaft, with the possible exception of the single-tooth normal letter-space mutilated gear. Fig. 18 is an enlarged detail view in vertical section taken from front to rear of the machine, showing the relation of one of the trippers to the locking rings or rollers. Fig. 19 is a detail perspective view of one of the trippers. Fig. 20 is a vertical section through the connection of one of the trippers to its actuating link. Fig. 21 is a detail perspective view of one of the locking rings or rollers.

Referring more particularly to the separate parts of this invention as embodied in the form shown in the drawings, 1 indicates numeral keys and 2 alphabet or character keys, which when depressed force down key levers 3 to swing type bars 4, through the intermediary of linkages 5, rearwardly up against the front side of a platen 6, mounted to rotate by means of an axle 7 extending in bearings 8 on a carriage 9. The carriage 9 is mounted between guideways 10, so as to be capable of traveling from left to right of the machine.

In order to traverse the carriage 9 either to the left or right, there is provided on the rear thereof, a rack 11, which is driven by a pinion 12 on a shaft 13 (Figs. 11, 12 and 13). The shaft 13 may be driven from a shaft 14, which is alined therewith, but the shafts 13 and 14 are not directly or rigidly connected together.

To enable a driving connection between the shafts 13 and 14, there is secured on the shaft 13, a clutch element 15, into mesh with which is normally held, by a spring 16, a sliding clutch 17, which is splined on the shaft 14. In passing, it may be noted that the clutch element 15 (Figs. 12 and 14) is provided with a detent ratchet wheel 18, into engagement with which is normally forced a justifying detent 19, by means of a spring 20. This spring-and-ratchet arrangement enables the accurate positioning of the carriage for any letter space after the carriage has been moved either to the right or to the left.

It is to be noted that the clutch element 17 is double-faced, that is to say, in addition to having clutch teeth which engage the clutch teeth of the clutch element 15, there are also provided on the opposite side, clutch teeth 21, whereby a mutual engagement may be brought about between the clutch element 17 and a clutch element 22 which is splined on a hub 23, the latter, however, being loosely mounted on the shaft 14. When there is a mutual engagement between the clutch element 17 and the clutch element 22, then the hub 23 will be driven from the shaft 14.

The hub 23 has formed or secured thereon, in any suitable manner, a gear 24 (Figs. 11 and 12), which meshes with a gear 25 on a parallel shaft 26. The latter extends forwardly where it is provided with a bevel gear 27 meshing to drive a companion bevel gear 28 on a shaft 29. The shaft 29 has secured thereon, at a point corresponding to the printing point of the typewriter, a pinion 30, which meshes with a long barrel gear or pinion 31 mounted to rotate on the carriage 9. The elongated barrel gear 31 is at least as long as the platen 6, so that it will be in mesh with the pinion 30 just so long as any point of the platen is opposite to the printing point of the typewriter. The barrel gear 31 is connected to rotate the platen 6 through a train of gears, comprising a pinion $31^a$, forming an extension or continuation of the barrel gear 31, idlers 32 and 33, and a gear 34 secured to the axle 7 of the platen 6.

It will thus be seen that when the shaft 14 is rotated and the clutch element 17 is interlocking with the clutch element 15, then the pinion 12 will be rotated so as to traverse the carriage 9 to the right or left according to the direction of rotation of the shaft 14. If, on the other hand, the clutch element 17 is disconnected from the clutch element 15 and interlocking with the clutch element 22, then the barrel pinion 31 will be rotated so as to rotate the platen either forwardly or backwardly, according to the direction of rotation of the shaft 14. Of course, if it is so desired, inasmuch as the clutch elements 17 and 22 are both splined for relative movement while yet connected in driving relation with the parts on which they are splined, a concomitant traveling movement of the carriage and rotating movement of the platen may be obtained.

It will now be shown how the shaft 14 obtains its rotation. The shaft 14 has secured at its rear end, a bevel gear 35, which meshes with a companion gear 36 on a vertical shaft 37, having, at its lower end, a bevel gear 38 meshing with a like gear 39 on a forwardly-extending shaft 40. On the front end of the shaft 40, there is provided a bevel gear 41 (Figs. 3 and 4), which meshes with a pair of oppositely-facing bevel gears 42 and 43 so as to be alternatively driven thereby in a direction corresponding to whichever of the gears 42 or 43 is driving it. The gears 42 and 43 are secured to abutting but relatively movable shafts 44 and 45, respectively. The shafts 44 and 45 may be alternatively driven from a continuously rotating shaft 46, which receives its drive from a motor 47 through the intermediary of a gear 48 on the shaft 46 and a pinion 49 on the motor shaft.

If it is desired to have an undetermined movement of the shaft 14 and thus of the platen or carriage, the shafts 44 and 45 may be selectively connected in driven relation with the shaft 46 for a continuous undetermined period of time. To accomplish this, there are secured on the shaft 46, adjacent opposite ends thereof, gears 50 and 51, which mesh, respectively, with gears 52 and 53 loosely mounted, respectively, on the shafts 44 and 45. To secure the gear 52 to the shaft 44, this gear is provided with a clutch element 54, into engagement with which may be brought a clutch element 55, which is splined on the shaft 44 and movable from a normal disconnected position by a controlling lever 56, to a connected position against the tension of a spring 57, which normally holds these clutch elements disconnected. For convenience, the control lever 56 being located at the left, is used to control a traveling movement of the carriage to the left, and correspondingly, a normal linespace movement of the platen forwardly. On the other hand, if it is desired to have either a return movement of the carriage or a reverse movement of the platen, a control lever 58 may be manipulated against the tension of a spring 59, to bring a clutch element 60, which is splined on the shaft 45, into locking engagement with a clutch element 61, secured to the gear 53, which is loosely mounted on the shaft 45. Such an arrangement will cause a continuous drive of the shaft 45 from the shaft 46, just so long as the clutch elements 60 and 61 are held in meshing engagement with each other.

In addition to the provision for an undetermined movement of either the platen or the carriage, provision is also made for a predetermined movement thereof in either one direction or the other. For this purpose, there are provided on the shaft 46, two series 62 and 63 of mutilated gears 64, which are normally disconnected from the continuously rotating shaft 46 but connectible thereto. The gears in each series have varying numbers of teeth starting with a mutilated gear with but one tooth and continuing successively with mutilated gears of two, three, four, and in this instance five teeth, corresponding, respectively, to one, two, three, four and five step movements of the platen or the carriage. The series 62 controls the spacing of the carriage to the left, and the series 63 controls the spacing of the carriage to the right. Likewise, the series 62 controls normal line-space movements of the platen forwardly, and the series 63 controls the reverse movement of the platen backwardly.

When connected to the shaft 46 so as to rotate therewith, each mutilated gear is arranged to drive a pinion 65, arranged in opposition thereto, an amount corresponding to the number of teeth on the particular mutilated gear. There is one of these pinions 65 secured on the shaft 44 for each mutilated gear in the series 62. There is likewise one of these pinions 65 on the shaft 45 for each of the mutilated gears in the series 63.

To bring about the connection of the mutilated gears in locked relation with the shaft 46 so that they will rotate therewith, each of these mutilated gears has pivotally mounted thereon, as at 66 (Fig. 10), a clutching pawl 67, which is normally urged by a spring 68, so as to tend to engage a clutch star or ratchet wheel 69, secured on the shaft 46 in juxtaposition with each of the mutilated gears. Each of the clutching pawls 67, however, is normally held out of engagement with its associated star wheel 69 against the tension of the spring 68, by means of a tripper or trigger 70 (Figs. 4, 18 and 19) pivotally mounted on a shaft or rod 71 and having a toe 72 engaging a lug 73 on the associated pawl 67.

To release any one of the clutching pawls 67, it is necessary to rock the associated tripper or trigger 70 about its pivot, to bring the toe 72 thereof out of engagement with the lug 73. To accomplish this, there are provided two series 74 and 75 of keys 76, which control, respectively, the connection of the mutilated gears of the series 62 and 63 to the shaft 46. Each key 76 is mounted on a bell crank lever 77, which is pivotally mounted on a shaft 78 (Fig. 4), so that when a key 76 is depressed, it will rock the bell crank to pull up on an associated link 79, which is connected to rock the associated tripper or trigger 70 against the tension of a spring 80. Each tripper or trigger is limited in its return movement by an enlargement 81 thereon engaging a transverse rod 82.

It will be noted after each depression of one of the keys 76, that the associated mutilated gear should be connected to the shaft 46 but for a single rotation. While the spring 80 might be depended upon to accomplish this, it is desirable to provide positive means for insuring the movement of the trippers or triggers 70 into the path of the lugs 73, to insure the disconnection of the clutches 67 from the associated star wheels 69. To accomplish this, each of the mutilated gears has secured thereto, so as to rotate therewith, a cam disk 83 having a cam 84 thereon, which is so located with respect to the teeth of the mutilated gear that is will come into play subsequent to the action of the teeth near the end of a single rotation of the mutilated gear. This cam engages a cam lever 85, of which there is one provided for each mutilated gear, so as to rock the same and thus rock a common shaft 86 to which all of the cam levers 85 are secured. The rock shaft 86 has also secured thereon, two pairs of arms 87, each pair of which is connected by a transverse universal bar 88 arranged to overlie the tails of all of the trippers or triggers 70. Thus, when any one of the mutilated gears has been connected to rotate with the shaft 46, the shaft 86 will be rocked near the end of the rotation of the particular mutilated gear, so as to depress the universal disconnecting bar 88, and thus force whichever tripper or trigger may have been rendered ineffective, to its effective tripping position.

In order to prevent overthrow of the mutilated gears, they are each provided with a locking disk 89 (Fig. 16), having a notch 90, into engagement with which is urged, by means of a spring 92, at the end of the rotation of the corresponding mutilated gear, a detent 91, pivotally mounted on the rod 82.

The rock shaft 86 also prevents overthrow of the shafts 44 and 45. For this purpose, these shafts are provided, at their opposite ends, with individual star or ratchet wheels 120 (Figs. 3 and 8), which are secured thereto and provided with the same number of teeth as the gears 65. Each of these star wheels 120 may be engaged by a detent 121, loosely mounted on the rock shaft 86. There is secured to the rock shaft 86, two arms 122, one for each of the detents 121. These arms are each provided with a pin 123 overlying the associated detent 121, so that when the shaft 86 is rocked, to bring about a positive return movement of the trippers or triggers 70, then the detents 121 will also be positively forced into engagement with their associated star wheels 120, to lock the shafts 44 and 45 in whatever position they may have been driven to. To a certain extent, these detents 121, having each a wedge toe engaging between the bevel teeth of the adjacent star wheel 120, act as justifying members. Each detent 121 is provided with a second arm 124, having a pair of notches 125 and 126 therein, which are engaged by a spring-pressed dog 127, which yieldingly holds the associated detent in either of its adjusted positions in or out of engagement with the associated star wheel 120.

It is, of course, desirable to enable a spacing of the carriage when any of the character keys 2 are struck, so as to bring the next letter space of the work-sheet opposite to the printing point. For this purpose, there is provided, underlying all of the key levers 3 for the alphabet keys 2, a universal bar 93, which joins a pair of arms 94 loosely mounted on the shaft 78. One of the arms 94 extends beyond the shaft 78, as at 95, where it is provided with a link 96 connecting it to the tripper or trigger 70 (Fig. 4) which corresponds with and controls the mutilated gear 64 in the series 62 which has but a single tooth corresponding to a single step movement of the carriage 9 in a travel to the left, that is, in a letter-feeding direction. The universal bar 93 and connected parts are returned after actuation to their normal position by one of the springs 80. It will be noted at this point, that the link 79 for the key 76, which also controls the activity of the particular mutilated gear 64 just mentioned, has a loose connection with the trigger 70, so as to permit the actuation of the trigger 70 by any of the alphabet keys 2, without a corresponding movement of this particular key 76.

As has been stated above, the movement of the platen or of the carriage is selective. The arrangement whereby this selection is made will now be described. The shifting of the clutch 17 which controls the effectiveness of the driving connection to the carriage-traversing gear 12, is controlled from a key 97 arranged in juxtaposition to the character keys of the typewriting mechanism. This key is mounted on a lever 98, which is pivoted intermediate its ends and connected by a link 99, to rock a bell crank shifting lever 100, which is forked at its other end and provided with pins 101, which engage in an annular groove 102 in the clutch 17. The clutch element 22 is also controlled by a key 103 (Fig. 4) mounted on a lever 104, which rocks about a pivot 105, so as to thrust up on one arm, 106, of a bell crank lever 107, through the intermediary of a connecting link 108. The other arm, 109, of this bell crank lever 107 is bifurcated at its upper end and provided with pins 110, which engage in an annular groove in the clutch element 22. A spring 111 is connected to the arm 109, so as to hold the clutch element 22 normally away from the clutch 17.

If it is desired to operate the platen solely, both of the keys 97 and 103 must be depressed simultaneously, so as to move the clutch 17 out of mesh with the clutch element 15, and move the clutch element 22 and the clutch 17 into mutual mesh with each other. Of course, the key 103 can be actuated alone to bring the clutch element 22 into engagement with the clutch 17, so as to afford a concomitant rotation of the platen with a traveling movement of the carriage, or, in other words, a simultaneous line-spacing and letter-spacing movement of said platen. Likewise, the key 97 can be operated alone, to disconnect the carriage from the driving train without connecting the platen in driven relation with the driving train.

In order that the spacing of the carriage and of the platen may be definite when any one of the keys 76 is depressed, provision is made whereby the mutilated gear of more than one key cannot be in action at the same time. For this purpose, all of the trippers or triggers 70, with the exception of the one coöperating with the one-tooth mutilated gear of the series 62, are extended at their tail end, to such an extent that when they are rocked, these tail ends will pass between a pair of locking rings or rollers 112. These locking rings 112 are loosely mounted in a runway or guideway 113, and the tails of the trippers 70 are arranged in alinement with slots 114 in this guideway, so that they can pass up into the same to spread apart the nearest two of these rings. The runway or guideway 113 is blocked at its ends, as at 115, to prevent more than a given movement of the rings, so that while there is sufficient space for one tripper 70 to enter between two rings, this will crowd the other rings together, so as to close up the spaces therebetween, preventing the intrusion of any of the other trippers 70. It will thus be seen that by this means, after one tripper is actuated and in its ineffective position, then no other tripper can be actuated until the one in play has returned to its normal position. Each of the trippers may be provided with a pair of notches 116 and 117, which are engaged by a detent 118 to yieldingly detail the tripper in both of its adjusted positions.

The operation of the device will be readily understood when taken in connection with the above description. Under normal conditions, the clutch element 22 will be out of mesh with the clutch 17, while the clutch 17 will be held over in mesh with the clutch element 15, so that any connection of the shaft 14 in driven relation with the motor will cause a movement of the carriage. This movement would depend in its direction on whether the controlling mechanism at the left of the machine was actuated, or whether that at the right was actuated, the left-hand mechanism controlling a movement of the carriage to the left, and the right-hand mechanism controlling a movement of the carriage to the right. If a continuous undetermined movement of the carriage is required, one of the levers 56 or 58 would be manipulated against the tension of its spring, to bring about the engagement of the associated clutches so as to effect a direct drive from the shaft 46 to one of the shafts 44 or 45. If, on the other hand, a predetermined movement of the carriage is desired, it is merely necessary to depress the particular key 76 corresponding to the desired number of spaces which it is necessary to move the carriage. For example, if it is desired to space the carriage two letter spaces to the left, the number "2" key in the series 74 would be depressed. On the other hand, if it is desired to space the carriage three spaces to the right, the number "3" key in the series 75 would be depressed, and so on. Whichever key is depressed will cause the connection of a mutilated gear having a corresponding number of teeth, to the shaft 46, so that this continuously-rotating shaft will rotate either the shaft 44 or 45 a corresponding number of steps or fractional parts of a revolution, thereby giving the carriage a movement equivalent to a like number of letter spaces.

If instead of traversing the carriage it is desired to rotate the platen, both of the keys 97 and 103 will be simultaneously depressed, for which they are arranged by their close juxtaposition, so as to concomitantly move the clutch 17 out of mesh with the clutch element 15 and bring about a mutual engagement of the clutch 17 with the clutch element 22. When this occurs, a direct drive will be afforded from the shaft 14 to the platen 6 no matter what the position may be of the platen and the carriage with respect to the frame of the machine. The shaft 14 can then be rotated in one direction or the other, either an undetermined amount by manipulating one of the levers 56 or 59 according to the direction of the rotation desired, or when a predetermined amount of rotation is required, by depressing one of the keys 76 either in the series 74 or the series 75, according to the direction of this predetermined movement required. This then will give a complete connection from the motor to the platen for a rotation of the latter selectively in one direction or the other and for a predetermined or undetermined amount. A concomitant movement of the platen and carriage can be obtained if required by any peculiar circumstances, by manipulating solely the key 103. Likewise, if necessary, the carriage can be disconnected from the driving train to the motor by manipulating solely the key 97.

Variations may be resorted to within the scope of the invention, and portions of the improvements may be used without others.

Having thus described my invention, I claim:

1. The combination, with a carriage; of a platen rotatably mounted on said carriage to travel therewith; a motor; driving connections leading from said motor and ramifying separately to said carriage and to said platen; and controlling mechanism for enabling said motor to actuate said ramifications concurrently, thereby to traverse said carriage and to rotate said platen during the travel of the latter with said carriage.

2. The combination, with a carriage; of a platen rotatably mounted on said carriage to travel therewith; a source of power; driving connections leading from said source of power and ramifying separately to said carriage and to said platen; and key-actuated controlling mechanism for enabling said source of power to actuate said ramifications concurrently, thereby to traverse said carriage and to rotate said platen during the travel of the latter with said carriage.

3. The combination with a carriage, of a platen rotatably mounted on said carriage, a motor, driving connections between said motor and said carriage and said platen, controlling mechanism for determining whether said carriage shall be traversed or said platen shall be rotated, and selective controlling devices for determining the definite extent of movement.

4. The combination with a carriage, of a platen rotatably mounted on said carriage, a motor, driving connections between said motor and both said carriage and said platen, controlling mechanism for determining whether said carriage or said platen shall be driven from said motor, and selective controlling devices for determining both the direction and definite extent of drive by said motor.

5. The combination with a carriage, of a platen rotatably mounted on said carriage, a motor, a normally inactive driving train leading from said motor, driving connections between said train and said platen, driving connections between said train and said carriage, and a plurality of connections, any one of which may render said train active to afford different definite extents of drive by said motor, each of said connections corresponding to different space movements of said platen or said carriage.

6. The combination with a carriage, of a platen rotatably mounted on said carriage, a motor for traversing said carriage and rotating said platen, a normally inactive driving train leading from said motor, driving connections between said train and said carriage, driving connections between said train and said platen, and connecting mechanism for rendering said train active at any one of a plurality of points corresponding to different definite movements of said carriage or said platen, starting with one space and increasing successively by individual increments of one space.

7. The combination with a carriage, of a platen rotatably mounted on said carriage, a motor for traversing said carriage and rotating said platen, a driving train leading from said motor, driving connections between said train and said platen, and driving connections between said train and said carriage, said train being normally inactive and having means to render it active, comprising a drive shaft, a driven shaft, and a connection between said shafts consisting of intermeshing loose and fixed gears and a clutch associated with the loose gear.

8. The combination with a carriage, of a platen rotatably mounted on said carriage, a motor for traversing said carriage and rotating said platen, a driving train leading from said motor, driving connections between said train and said carriage, and driving connections between said train and said platen, said train being normally ineffective and having means to render the same effective, comprising a drive shaft, a driven shaft, and a connection between said shafts consisting of intermeshing loose and fixed gears, a clutch associated with the loose gear, and spring means for normally holding said clutch in its disconnected position.

9. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a drive shaft, a driven shaft, and a connection between said shafts consisting of intermeshing loose and fixed gears, a clutch associated with the loose gear, spring means for normally holding said clutch in its disconnected position, and a lever for manipulating said clutch against the tension of said spring means.

10. The combination with a carriage, of a platen rotatably mounted on said carriage, a motor for traversing said carriage and rotating said platen, a driving train leading from said motor, driving connections between said train and said carriage, and driving connections between said train and said platen, said train being normally ineffective and having means for rendering it effective, comprising a drive shaft, a driven shaft, and a connection between said shafts consisting of intermeshing loose and fixed gears, a clutch associated with the loose gear, and a key for controlling the effectiveness of said clutch.

11. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a drive shaft, a driven shaft, and a connection between said shafts consisting of intermeshing loose and fixed gears, a clutch associated with the loose gear, a tripper for said clutch, and a key for actuating said tripper.

12. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a drive shaft, a driven shaft, and a connection between said shafts consisting of intermeshing loose and fixed gears, a clutch associated with the loose gear, a tripper for releasing said clutch, a key for manipulating said tripper, and means for positively forcing said tripper to a position such that it will disconnect said clutch after a predetermined movement of said loose gear.

13. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a drive shaft, a driven shaft, and a connection between said shafts consisting of intermeshing loose and fixed gears, a clutch associated with the loose gear, a spring normally tending to bring the parts of said clutch into connecting relation with each other, a tripper for spreading the parts of said clutch apart against the tension of said spring, and a key for releasing said tripper.

14. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of intermeshing loose and fixed gears, a clutch associated with the loose gear, a spring normally tending to bring the parts of said clutch into connecting relation with each other, a tripper for spreading the parts of said clutch apart against the tension of said spring, a key for releasing said tripper, and positive means actuated by each rotation of said loose gear for positively actuating said tripper, to enable the same to disconnect the parts of said clutch so as to interrupt said train after a predetermined rotation of said loose gear.

15. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a drive shaft, a driven shaft, and a connection between said shafts consisting of a loose mutilated gear, a fixed gear meshing therewith, and a clutch associated with said loose gear.

16. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of a loose mutilated gear, a fixed gear meshing therewith, a clutch associated with the mutilated gear, and means for disconnecting said clutch after said mutilated gear has completed a single rotation.

17. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of intermeshing loose and fixed gears, one of said gears being mutilated, and clutching means associated with said loose gear.

18. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of intermeshing series of loose and fixed gears, the gears of one series being mutilated and each one having a different number of teeth from every other one in the series, individual clutches associated with the loose gears, and selective means for alternatively determining which of said clutches shall be effective.

19. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of intermeshing series of loose and fixed gears, the gears of one series being mutilated and each one having a different number of teeth from every other one in the series, individual clutches associated with said loose gears individually, selective means for alternatively determining which of said clutches shall be effective, and disconnecting means operative after a predetermined rotation of a loose gear, to disconnect the same.

20. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a drive shaft, a driven shaft, and a connection between said shafts consisting of intermeshing series of loose and fixed gears, a clutch individual to each of said loose gears, and disconnecting means for manipulating the parts of said clutches to disconnect their respective gears after a predetermined rotation.

21. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a pair of driven shafts determining the direction of drive of said train by said motor, a drive shaft, and selective mechanism for connecting said drive shaft in driving relation with either of said driven shafts.

22. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active, comprising a pair of driven shafts determining the direction of movement of said carriage or said platen by said motor, a drive shaft, selective connections between said drive shaft and either of said driven shafts to afford an undetermined drive of said train from said motor, and connections between said drive shaft and said driven shafts for affording predetermined extents of drive by said motor of either of said driven shafts.

23. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a pair of driven shafts determining the direction of movement of said carriage or said platen, a drive shaft, a gear loosely mounted on each of said driven shafts, a pair of gears meshing with said first-mentioned gears and fixed to said drive shaft, a clutch for connecting each of said loosely-mounted gears with its shaft, spring means normally holding said clutches in their ineffective positions, and individual levers for enabling the manipulation of said clutches to their effective positions.

24. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a pair of driven shafts determining the direction of movement of said carriage or said platen, a series of gears fixed on each of said driven shafts, a drive shaft, two series of gears loosely mounted on said drive shaft, and means for connecting said loosely-mounted gears individually to said drive shaft for a predetermined period.

25. The combination with a carriage, of a platen rotatably mounted on said carriage, a motor for traversing said carriage and rotating said platen, a driving train leading from said motor, driving connections between said train and said carriage, and driving connections between said train and said platen, said train being normally inactive and having means to render the same active comprising a pair of driven shafts determining individually the direction of movement of said carriage or said platen, a series of gears fixed on each of said driven shafts, a drive shaft, two series of gears loosely mounted on said drive shaft and arranged to drive said fixed gears, a clutch individual to each of said loosely-mounted gears for connecting the same to rotate with said drive shaft, each of said loosely-mounted gears having a different number of teeth from its fellows, corresponding to a different extent of rotation of the associated fixed gear on one of the driven shafts, and means for manipulating said clutches to render the same effective and ineffective.

26. The combination with a carriage, of a platen mounted on said carriage, a motor for traversing said carriage and rotating said platen, controlling mechanism for governing the movements of said carriage and said platen by said motor, coöperating clutches for determining whether said carriage or said platen shall be manipulated, and means for shifting said clutches.

27. The combination with a carriage, of a platen mounted on said carriage, a motor for traversing said carriage and rotating said platen, controlling mechanism for governing the movements of said carriage and said platen by said motor, coöperating clutches for determining whether said carriage or said platen shall be manipulated, and means for shifting said clutches, said means including keys individual to said carriage and said platen.

28. The combination with a carriage, of a platen rotatably mounted on said carriage, a motor for traversing said carriage and rotating said platen, controlling mechanism for governing the movements of said carriage and said platen by said motor, and means for rendering both said carriage and said platen independent of said controlling mechanism.

29. The combination with two primary elements, to wit, a carriage and a platen rotatably mounted on said carriage, of a motor for traversing said carriage and rotating said platen, controlling mechanism for governing the movements of said carriage and said platen by said motor, and separate means normally holding one of said primary elements subservient to the control of said controlling mechanism and the other of said elements independent of the control of said controlling mechanism.

30. The combination with two primary elements, to wit, a carriage and a platen rotatably mounted on said carriage, of a motor for traversing said carriage and rotating said platen, controlling mechanism for determining the movements of said carriage and said platen by said motor, means normally holding one of said elements subservient to said controlling mechanism, means normally holding the other of said elements independent of said controlling mechanism, and means for reversing the subservience of said primary elements to said controlling mechanism.

31. The combination with two primary elements, to wit, a carriage and a platen rotatably mounted on said carriage, of a motor for traversing said carriage and rotating said platen, controlling mechanism for determining the movements of said carriage and said platen by said motor, means normally holding one of said elements subservient to said controlling mechanism, means normally holding the other of said elements independent of said controlling mechanism, key means for rendering the subservient element free and independent of said controlling mechanism, and key means for rendering the independent element subservient to said controlling mechanism.

32. The combination with a carriage, of a platen rotatably mounted on said carriage, a motor for traversing said carriage and rotating said platen, a shaft, a driving train leading to said shaft from said motor, a secondary driving train from said shaft to said platen, a secondary driving train from said shaft to said carriage, and clutching mechanism for determining the effective connection of said secondary driving trains to said shaft.

33. The combination with a carriage, of a platen rotatably mounted on said carriage, a motor for traversing said carriage and rotating said platen, a driving train leading from said motor, a shaft connected to said train, a secondary driving train from said shaft to said platen including a clutch element, a secondary driving train from said shaft to said carriage including a clutch element, and a clutch element splined on said shaft for connecting either of said first-mentioned clutch elements to rotate with said shaft.

34. The combination with a carriage, of a platen rotatably mounted on said carriage, a motor for traversing said carriage and rotating said platen, a shaft, a driving train leading to said shaft from said motor, a secondary driving train from said shaft to said motor, a secondary driving train from said shaft to said carriage including a clutch element, a secondary driving train from said shaft to said platen including a clutch element, a clutch element on said shaft, and means for bringing about a relative movement between said clutch elements to determine the effective driving connection between said motor and either said carriage or said platen.

35. The combination with a carriage, of a platen rotatably mounted on said carriage, a motor for traversing said carriage and rotating said platen, a shaft, a driving train leading to said shaft from said motor, a secondary driving train from said shaft to said carriage including a clutch element, a secondary driving train from said shaft to said platen including a clutch element, one of the clutch elements of said secondary driving trains being splined to enable a clutching movement, a clutch element on said shaft, and means for manipulating said splined clutch element to determine the effective connection between said secondary driving trains and said shaft.

36. The combination with a carriage, of a platen rotatably mounted on said carriage, a motor for traversing said carriage and rotating said platen, a shaft, a driving train leading to said shaft from said motor, a secondary driving train from said shaft to said carriage including a clutch element, a secondary driving train from said shaft to said platen including a clutch element, a clutch element splined on said shaft intermediate said first-mentioned clutch elements, and means for shifting said last-mentioned clutch element into engagement with one or the other of said first-mentioned clutch elements to bring about a driving connection between said shaft and said carriage or said platen.

37. The combination with a carriage, of a platen rotatably mounted on said carriage, a pinion for traversing said carriage, a gear connected to rotate said platen, a clutch element connected to said gear, a clutch element connected to said pinion, a shaft, means for driving said shaft, a clutch element connected to rotate with the shaft, and means for bringing about a relative movement between said clutch elements to determine the drive by said shaft of either said gear or said pinion.

38. The combination with a carriage, of a platen rotatably mounted on said carriage, a pinion for traversing said carriage, a gear connected to rotate said platen, a clutch element connected to said gear, a clutch element connected to said pinion, a shaft, means for driving said shaft, a clutch element connected to rotate with the shaft, means for bringing about a relative movement between said clutch elements to determine the drive by said shaft of either said gear or said pinion, a detent wheel connected to one of said clutch elements, and a justifying detent engaging said wheel to accurately determine the position of one of said clutch elements.

39. The combination with a carriage, of a platen rotatably mounted on said carriage, a gear connected to rotate said platen, a gear connected to traverse said carriage, a clutch element connected to rotate with one of said gears, a clutch element having a splined connection with the other of said gears, a shaft, means for driving said shaft, a clutch on said shaft, and means for shifting said splined clutch element to bring about a driving connection of its gear with said shaft.

40. The combination with a carriage, of a platen rotatably mounted on said carriage, a gear connected to rotate said platen, a gear connected to traverse said carriage, a clutch element connected to each of said gears, a shaft, means for driving said shaft, a clutch element connected to said shaft, and keys for shifting certain of said clutch elements to enable the driving of said gears from said shaft.

41. The combination with a carriage, of a platen rotatably mounted on said carriage, a shaft, means for driving said shaft, a gear loosely mounted on said shaft, a second shaft abutting said first shaft but disconnected therefrom, a pinion on said second shaft, driving connections between said gear and said platen, means to enable said pinion to traverse said carriage, a clutch connected to said gear, a clutch connected to said second shaft, and a clutch on said first shaft arranged to engage either of said first-mentioned clutches to bring about a driving connection between said first-mentioned shaft and either said platen or said carriage.

42. The combination with a carriage, of a platen rotatably mounted on said carriage, a shaft, means for driving said shaft, a gear loosely mounted on said shaft, driving connections between said gear and said platen, a hub connected to said gear, a clutch element splined on said hub, a second shaft, a pinion secured to said second shaft, a rack on said carriage and engaging said pinion, a clutch element secured to said second shaft, a double clutch element splined on said first shaft, means for shifting said first-mentioned clutch element into engagement with the third-mentioned clutch element to complete the driving connection between said first-mentioned shaft and said platen, and means to shift said third-mentioned clutch element into engagement with said second-mentioned clutch element to complete the driving connection between said first-mentioned shaft and said carriage.

43. The combination with two primary elements, to wit, a carriage and a platen rotatably mounted on said carriage, of separate series of keys for controlling the movements of one of said elements in normal and reverse directions, and locking means for preventing the actuation of more than one of the total number of keys at a time, said locking means having a limited play admitting of the actuation of one of said keys and preventing the simultaneous actuation of more than one of said keys.

44. The combination with two primary elements, to wit, a carriage and a platen rotatably mounted on said carriage, of means controlling the movements of said primary elements, said means including a series of keys, a tripper actuated by and individual to each of said keys, and locking mechanism for preventing the actuation of more than one of said keys at a time, said locking mechanism including a guide and a series of rollers loosely mounted in said guide and having a limited aggregate play therebetween, the extent of said play being just sufficient to admit of the intrusion of one of said trippers between two of said rollers at the actuation of one of said keys and to prevent the further intrusion of other trippers while one of said trippers is between a pair of said rollers.

45. The combination with two primary elements, to wit, a carriage and a platen rotatably mounted on said carriage, a motor for driving one of said elements, selective connections to enable different characters of drive by said motor, and locking means for preventing more than one of said connections to be in active play at a time.

46. The combination with two primary elements, to wit, a carriage and a platen rotatably mounted on said carriage, a motor for driving one of said elements, selective connections to enable different characters of drive by said motor, and locking means for preventing more than one of said connections to be in active play at a time, each of said connections having a part moving therewith at the effective action thereof to intrude in said locking mechanism, said locking mechanism having a receptive capacity just sufficient for solely one of said parts to intrude therein at one time.

47. The combination with two primary elements, to wit, a carriage and a platen rotatably mounted on said carriage, of a motor for driving one of said elements, selective connections for determining the direction of drive by said motor, and locking means for preventing the active operation of more than one of said selective connections at a time.

48. The combination with two primary elements, to wit, a carriage and a platen rotatably mounted on said carriage, of a motor for driving one of said primary elements, selective connections for determining the extent of drive by said motor, and locking means for preventing more than one selective connection being in action at a given time so as to enable a definite drive by said motor.

49. The combination with two primary elements, to wit, a carriage and a platen rotatably mounted on said carriage, of a motor for driving one of said elements, selective connections for determining the direction and extent of drive by said motor, and locking means for limiting at any time the drive by said motor to one direction and to one extent.

50. The combination with two primary elements, to wit, a carriage and a platen rotatably mounted on said carriage, of a motor for driving either of said elements, and selective connections for determining individually both the extent and direction of drive by said motor.

51. The combination with a carriage, of a platen rotatably mounted on said carriage, actuating means for rotating said platen or traversing said carriage, and selective controlling means for enabling back and forth traversing movements of different predetermined extents of said carriage and back and forth rotary movements of different predetermined extents of said platen by said actuating means.

52. The combination with a carriage, of a platen rotatably mounted on said carriage, and driving mechanism for effecting a concomitant rotation of said platen for many line spaces, and a traveling movement of said carriage for many letter spaces.

53. The combination, with a carriage; of a platen rotatably mounted on said carriage to travel therewith; a source of power; and driving connections leading from said source of power and ramifying separately to said carriage and to said platen, said ramifications being operable concurrently to move the carriage in letter-feeding direction and to rotate said platen during the aforesaid movement of the carriage.

54. The combination with a traveling carriage, of a platen rotatably mounted on said carriage, gearing for selectively obtaining driving actions of predetermined degree according to one, two, three, etc., units, and driving connections from said gearing to said carriage and said platen enabling a selective drive of said carriage in the direction of the length of said platen one, two, three, etc., letter spaces or multiples thereof, or a rotation of said platen circumferentially one, two, three, etc., line spaces or multiples thereof.

55. The combination with a traveling carriage, of a platen rotatably mounted on said carriage, selective driving trains to said carriage and said platen enabling the rotation of said platen or the traversing of said carriage, gearing for driving said trains, having parts determining a continuous indefinite drive, and parts determining selectively definite drives of different extent of one, two, three, etc., units, means for shifting parts of said trains to determine whether said platen shall be rotated or said carriage traversed, and selective means for shifting parts of said gearing for determining the character of drive of said trains.

56. The combination with a carriage, of a platen rotatably mounted on said carriage, selective driving means for alternatively rotating said platen or traversing said carriage, gearing for driving said selective driving means having parts enabling an indefinite drive in one direction or the other, and also having parts enabling selective definite drives in one direction or the other amounts corresponding to one, two, three, etc., units, manually-controlled means for shifting parts of said selective driving means to determine whether said carriage shall be traversed, or said platen shall be rotated, and manually-controlled means for shifting parts of said gearing for determining the direction of drive of said selective driving means, the definiteness of drive of said selective driving means, and the extent of drive of said selective driving means.

57. The combination with a carriage, of a platen rotatably mounted on said carriage, and driving gearing for concomitantly rotating said platen backwardly, and returning said carriage.

58. The combination with a carriage, of a platen rotatably mounted on said carriage, a motor, driving gearing connecting said motor with said carriage and with said platen, controlling means for said gearing enabling a rotation of said platen or a traveling movement of said carriage in a normal direction or a reverse direction an undetermined amount, and controlling means for said gearing enabling a rotation of said platen or a traveling movement of said carriage in a normal direction or a reverse direction predetermined variable amounts.

59. The combination with a carriage, of a platen rotatably mounted on said carriage, a motor, driving gearing between said motor and said platen and said carriage enabling a rotation of said platen by said motor or a traveling drive of said carriage by said motor, controlling means for said gearing enabling an undetermined rotary movement of said platen or an undetermined traveling movement of said carriage, and controlling means for said gearing enabling rotation of said platen by said motor definite amounts of variable extent, or traveling movement of said carriage definite amounts of variable extent.

60. The combination with a carriage, of a platen rotatably mounted on said carriage, a motor, driving gearing connecting said motor with said carriage and said platen enabling a traveling drive of said carriage or a rotary drive of said platen by said motor, and controlling mechanism for said gearing enabling predetermined movements thereof of variable amounts, so as to either drive said carriage definite amounts of variable extent, or rotate said platen definite amounts of variable extent.

61. The combination with a carriage, and a platen mounted on said carriage to travel therewith, of a motor, a driving train leading from said motor, driving connections between said train and said carriage, driving connections between said train and said platen, and means to produce simultaneous actuation of both driving connections, to enable said motor to traverse said carriage and to rotate said platen during the travel of the latter with the carriage.

62. The combination with a carriage, and a platen mounted on said carriage to travel therewith, of a motor, a driving train leading from said motor, driving connections between said train and said carriage, driving connections between said train and said platen, means to produce simultaneous actuation of both driving connections, to enable said motor to traverse said carriage and to rotate said platen during the travel of the latter with the carriage, and controlling mechanism to determine the extent of travel of the carriage and rotation of the platen.

63. The combination with a carriage, and a platen mounted on said carriage to travel therewith, of a motor, a driving train leading from said motor, driving connections between said train and said carriage, driving connections between said train and said platen, means to produce simultaneous actuation of both driving connections, to enable said motor to traverse said carriage and to rotate said platen during the travel of the latter with the carriage, and controlling mechanism to determine the direction of travel of the carriage and rotation of the platen.

64. The combination with a carriage, and a platen mounted on said carriage to travel therewith, of a motor, a driving train leading from said motor, driving connections between said train and said carriage, driving connections between said train and said platen, means to produce simultaneous actuation of both driving connections, to enable said motor to traverse said carriage and to rotate said platen during the travel of the latter with the carriage, and controlling mechanism to determine the extent and direction of travel of the carriage and rotation of the platen.

65. The combination with two primary elements, to wit: a carriage, and a platen rotatably mounted on the carriage, of actuating mechanism for alternatively causing a traversing movement of the carriage and a rotary movement of the platen, mechanism for determining whether said carriage or said platen shall be driven by said actuating mechanism, a series of connections for selectively determining the extent of movement in normal direction of the element driven, a separate series of connections for selectively determining the extent of movement in reverse direction of the element driven, and locking means to prevent concurrent actuation of connections in both series.

66. The combination with two primary elements, to wit: a carriage, and a platen rotatably mounted thereon, of actuating mechanism for alternatively causing a traversing movement of the carriage and a rotary movement of the platen, mechanism for determining whether said carriage or said platen shall be driven by the actuating mechanism, a series of devices for causing such drive to take place in normal direction, a separate series of devices for causing the drive to take place in reverse direction, and locking means to prevent concurrent actuation of devices in both series.

67. The combination with a platen, mechanism for line-spacing the platen, and mechanism for letter-spacing said platen, of a motor, and means for selectively connecting either spacing mechanism to said motor, to alternatively line-space or letter-space said platen to an extent corresponding to a predetermined plural number of line-spaces or letter-spaces, respectively.

68. The combination with a platen, mechanism for line-spacing the platen, and mechanism for letter-spacing said platen, of a motor, and means for selectively connecting either spacing mechanism to said motor, to alternatively line-space or letter-space said platen in either normal or reverse direction to an extent corresponding to a predetermined plural number of line-spaces or letter-spaces, respectively.

69. The combination with a platen, mechanism for line-spacing the platen, and mechanism for letter-spacing said platen, of a motor, driving connections joining said motor with both spacing mechanisms, and controlling mechanism to enable said motor to operate said spacing mechanisms simultaneously, to simultaneously line-space and letter-space said platen.

70. The combination with a platen, mechanism for line-spacing the platen, and mechanism for letter-spacing said platen, of a motor, driving connections joining said motor with both spacing mechanisms, and controlling mechanism to enable said motor to operate said spacing mechanisms simultaneously, to simultaneously line-space and letter-space said platen in either normal or reverse direction.

71. The combination with a platen, mechanism for line-spacing the platen, and mechanism for letter-spacing said platen, of a motor, driving connections joining said motor with both spacing mechanisms, and controlling mechanism to enable said motor to operate said spacing mechanisms simultaneously, to simultaneously line-space and letter-space said platen to an extent corresponding to a predetermined plural number of line-spaces and letter-spaces.

72. The combination with a platen, mechanism for line-spacing the platen, and mechanism for letter-spacing said platen, of a motor, driving connections joining said motor with both spacing mechanisms, and controlling mechanism to enable said motor to operate said spacing mechanisms simultaneously, to simultaneously line-space and letter-space said platen in either normal or reverse direction to an extent corresponding to a predetermined plural number of line-spaces and letter-spaces.

73. The combination with a platen, mechanism for line-spacing the platen, and mechanism for letter-spacing said platen, of a motor, driving connections joining said motor with both spacing mechanisms, key-controlled mechanism to enable said motor to operate said spacing mechanisms simultaneously, to simultaneously line-space and letter-space said platen, and additional controlling keys to determine the extent of such spacing.

74. The combination with a platen, mechanism for line-spacing the platen, and mechanism for letter-spacing said platen, of a motor, driving connections joining said motor with both spacing mechanisms, and selective controlling keys to enable said motor to operate said spacing mechanisms alternatively, to either line-space or letter-space said platen to an extent corresponding to a predetermined plural number of line-spaces or letter-spaces.

75. The combination with a platen, mechanism for line-spacing the platen, and mechanism for letter-spacing said platen, of a motor, driving connections joining said motor with both spacing mechanisms, and separate controlling keys to enable said motor to operate said spacing mechanisms alternatively, to alternatively line-space or letter-space said platen definite amounts of variable extent.

76. The combination with a platen, mechanism for line-spacing the platen, and mechanism for letter-spacing said platen, of a motor, driving connections joining said motor with both spacing mechanisms, and separate controlling keys to enable said motor to operate said spacing mechanisms alternatively, to alternatively line-space or letter-space said platen definite amounts of variable extent, in either normal or reverse direction.

77. The combination with a platen, mechanism for letter-spacing the platen, and mechanism for line-spacing the platen, of a motor, a driving train leading from said motor to both spacing mechanisms, mechanism for determining which of said spacing mechanisms shall be driven by said motor, and selective devices for enabling such drive to take place to different predetermined extents.

78. The combination with a platen, mechanism for letter-spacing the platen, and mechanism for line-spacing the platen, of a motor, a driving train leading from said motor to both spacing mechanisms, mechanism for determining which of said spacing mechanisms shall be driven by said motor, and selective devices for enabling such drive to take place to different predetermined extents, and in either normal or reverse direction.

79. The combination with a platen, mechanism for line-spacing said platen, and mechanism for letter-spacing said platen, of a motor, driving connections joining said motor to both spacing mechanisms, a key to enable said motor to alternatively operate said spacing mechanisms in normal direction only and to the definite extent of a single space only, and a separate key to enable said motor to alternatively operate said spacing mechanisms in reverse direction only and to the definite extent of a single space only.

SAMUEL E. CARLIN.

Witnesses:
 CHARLES S. WILSON,
 ALLENA OFFUTT.